United States Patent
Laverone et al.

(10) Patent No.: US 8,132,183 B2
(45) Date of Patent: Mar. 6, 2012

(54) METHODS, SYSTEMS AND COMPUTER PROGRAM PRODUCTS FOR DYNAMIC CATEGORIZED EVENT COOL OFF FOR CIM INDICATIONS

(75) Inventors: Craig A. Laverone, Sunnyvale, CA (US); Kevin J. Webster, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 12/145,209

(22) Filed: Jun. 24, 2008

(65) Prior Publication Data
US 2009/0320046 A1 Dec. 24, 2009

(51) Int. Cl.
*G06F 9/44* (2006.01)
(52) U.S. Cl. ......................................... 719/318
(58) Field of Classification Search ............ 719/318
See application file for complete search history.

(56) References Cited

U.S. PATENT DOCUMENTS

| | | | |
|---|---|---|---|
| 6,427,168 B1 * | 7/2002 | McCollum | 709/224 |
| 7,043,732 B2 * | 5/2006 | Mandal et al. | 719/310 |
| 7,725,473 B2 * | 5/2010 | Lamb et al. | 707/758 |
| 7,958,514 B2 * | 6/2011 | Acuna et al. | 719/316 |
| 2007/0299951 A1 * | 12/2007 | Krithivas | 709/223 |

\* cited by examiner

*Primary Examiner* — Van Nguyen
(74) *Attorney, Agent, or Firm* — Cantor Colburn LLP; Feb Cabrasawan

(57) ABSTRACT

Methods, systems and computer program products for dynamic categorized event cool off for CIM indications. Exemplary embodiments include a method for dynamic categorized event cool-off for CIM indications for a SMIS client having a handler for CIM indications, the method including categorizing incoming CIM Indications into the SMIS client, the categorization being based on the handler for the CIM indications, identifying a default delay of CIM indications handling during SMIS client operation in an absence of an indications storm, detecting the presence of an indications storm in the SMIS client, generating an alert when the indications storm is detected, increasing the default delay of CIM indications handling during the indications storm, and returning the default delay of CIM indications handling to Event-CoolOffPeriod.

2 Claims, 2 Drawing Sheets

METHODS, SYSTEMS AND COMPUTER PROGRAM PRODUCTS FOR DYNAMIC CATEGORIZED EVENT COOL OFF FOR CIM INDICATIONS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field of the Invention

This invention relates to common information model (CIM) indications, and particularly to methods, systems and computer program products for dynamic categorized event cool off for CIM indications.

2. Description of Background

Storage Management Initiative—Specification (SMIS) Agents for switches and fabrics are agents that are proxy to the switches or embedded on the switches and provide management information and control of the switches through the standard SMIS interface. A storage area network (SAN) Management client can subscribe to receive events from the SMIS Agent, known as common information model (CIM) Indications. Standard CIM Indications are defined and supported by the SMIS Agents for events such as: Active ZoneSet Changed; Full Zone Database Changed; Switch Port Operational Status Changed; Switch Operational Status Changed; Node Port or Node Discovered; and Node Port or Node Missing. SMIS Client applications can subscribe to each type of Indication by using defined "Filters".

SMIS-enabled SAN management applications ("SMIS Clients") may have "Handlers" for running post-indication algorithms for different categories of CIM Indications. These Handlers may make post-indication inquiries to the SMIS Agent in order to obtain further information. The set of post-indication requests made to the SMIS Agent may be dependent on the type of CIM Indication delivered.

SMIS Agents may enter into a state where a constant stream of indications is sent. This is commonly referred to as an Indications Storm. An example of this is Brocade CIM_InstModification Indications for switch ports flip-flopping from OperationalStatus of 'okay' to OperationalStatus of 'unknown'. An Indications Storm can potentially cause several problems, including: 1) The SMIS Client can become busy trying to route all of the Indications to the appropriate processing methods for handling the indications, 2) The SMIS Client may be designed to have a limited number of CIM Client threads that can be running at once, which is a potential bottleneck for post-Indication Inquiries during an Indications Storm, and 3) Performance of the SMIS Agent may slow down because it is so busy generating Indications and processing a constant stream of post-Indication requests to the SMIS Agent.

The SMIS 1.1 specification includes a standard mechanism to suppress redundant indications. The SMIS Client defines the indication suppression policy at the time that the indications are subscribed to. The SMIS 1.1 specification defines a use of the RepeatNotificationPolicy property, which defines the desired behavior for handling Indications that report the occurrence of the same underlying event (e.g., the disk is still generating I/O errors and has not yet been repaired).

However, there are drawbacks and known issues to the solution defined in the SMIS 1.1 specification. One problem is that two or more Indication Filters may be routed to the same Handler. Another problem of the solution is that users of SMIS Client applications may prefer CIM Indication delivery suppression intervals to be a shorter time interval than a time interval used by the SMIS Client application for handling the CIM Indications. In addition, these SMIS Standard properties for suppressing Indications are not yet supported by some SMIS Agents. Furthermore, the user may desire that indication suppression intervals adjust dynamically during indication storm periods.

Another solution to handling an Indications storm is the implementation of Static and Common EventCoolOff, in which a SAN Management client uses an EventCoolOffPeriod that is static and commonly used for all indications. The EventCoolOffPeriod in this case would only process the last CIM Indication received for a fabric during the EventCoolOff period. However, there are also drawbacks for using a Static and Common EventCoolOff. Since SMIS has well-defined standard Indication Filters, a "single Handler for all fabric events" (i.e. "common") approach should not be used. Multiple handlers is appropriate for SMIS, because each handler can trigger a different set of post-Indication requests to the SMIS Agents, based on the standard Indication Filter for which the CIM Indication was generated for. A common EventCoolOff period in this scenario would erroneously not process some CIM Indications because it would assume that handling of the last indication received during the EventCoolOffPeriod would discover all changes to the fabric that occurred during the EventCoolOffPeriod. SAN Management applications using a common EventCoolOffPeriod must also have a common post-event discovery algorithm for properly discovering all fabric changes. However such an implementation has inherent scalability and performance concerns because of the scope of the large discovery algorithm needed. In addition, the user may desire dynamically adjusting delay periods before handling the events rather than keep the delay period "static". "Static" delay periods may be too small during periods of high activity on the fabric.

SUMMARY

Exemplary embodiments include a method for dynamic categorized event cool-off for CIM indications for a SMIS client having a set of handlers for CIM indications, the method including categorizing incoming CIM Indications into the SMIS client, the categorization being based on a combination of (1) the Common Information Model Object Manager (CIMOM) which delivered the indication, (2) the storage entity represented in the CIM Indication (i.e. a specific port, switch, etc), and (3) the Handler to which the CIM Indication will be routed to for processing, identifying a default delay of CIM indications handling during SMIS client operation in an absence of an indications storm, the default delay given by EventCoolOffPeriod, which suppresses a subsequent processing of the CIM indication handling such that for each EventCoolOffPeriod, if one or more Indications are received for a given combination of CIM indication handling process and storage entity, the given CIM indication handling process is invoked only once for this storage entity, detecting the presence of an indications storm in the SMIS client, generating an alert when the indications storm is detected, increasing the default delay of CIM indications handling during the indications storm, wherein an increase of the default delay of CIM indications handling is a dynamic delay given by a product of the EventCoolOffPeriod and a multiplier, DynamicEventCoolOffMultiplier and returning the default delay of CIM indications handling to EventCoolOffPeriod.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides the ability to implement a dynamic categorized event cool off for CIM indications. The methods, systems and computer program products described herein 1) Categorize incoming CIM Indications based on the combination of (1) the CIMOM which delivered the indication, (2) the storage entity represented in the CIM Indication (i.e. a specific port, switch, etc), and (3) the Handler to which the CIM Indication will be routed to for processing; 2) Implement an EventCoolOffPeriod defined for the SMIS Client application that suppresses processing CIM Indication Handling such that for each EventCoolOffPeriod, if one or more Indications was received for a given combination of CIMOM, Handling Process and storage entity, the Handling Process is invoked only once; 3) Detect an Indications Storm; 4) Alert the user when an Indications Storm is detected; and 5) Dynamically increase the EventCoolOffPeriod during the Indications Storm.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
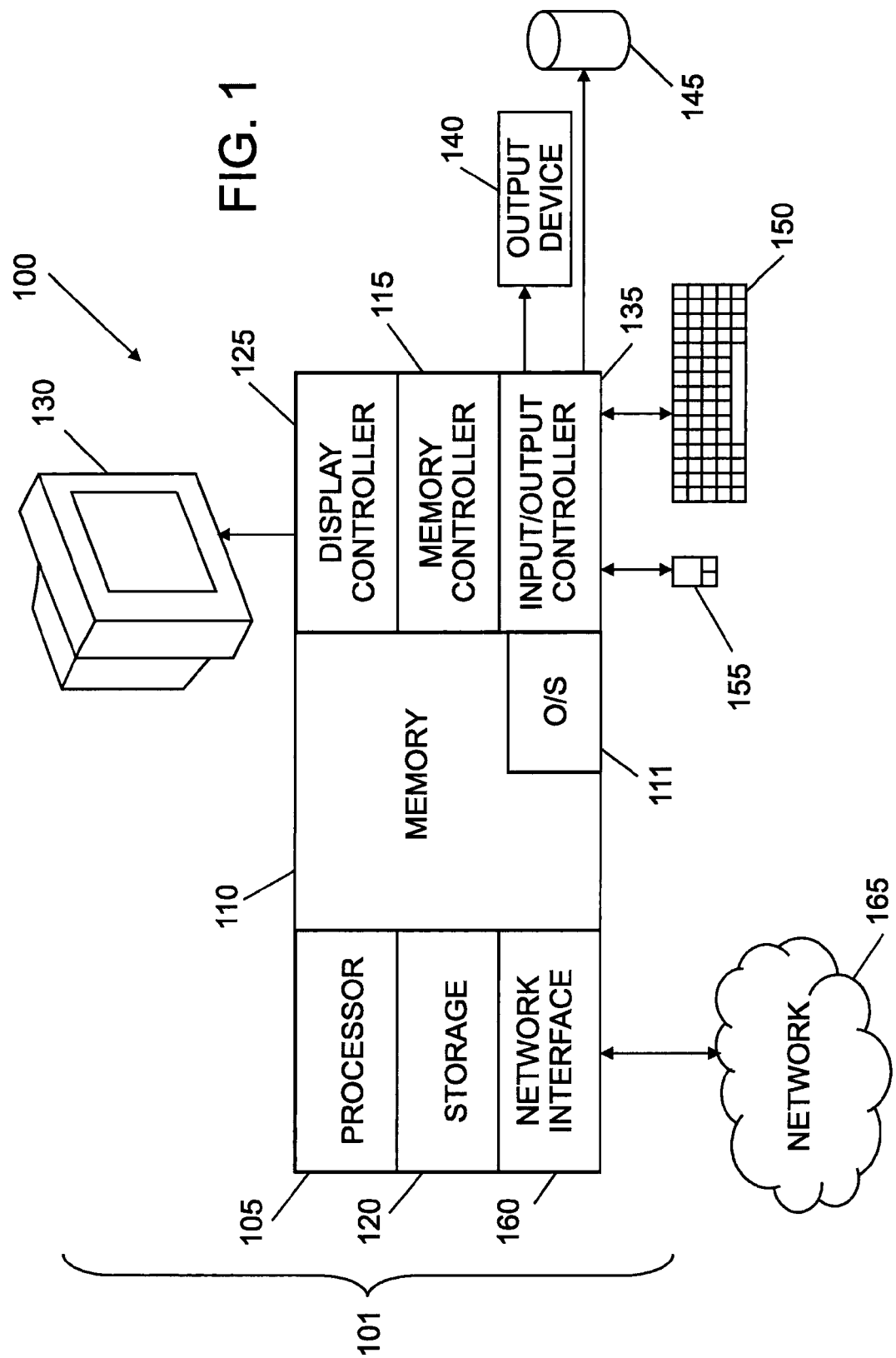
FIG. 1 illustrates an exemplary embodiment of a system for dynamic categorized event cool off for CIM indications.

The detailed description explains the preferred embodiments of the invention, together with advantages and features, by way of example with reference to the drawings.

DETAILED DESCRIPTION

Exemplary embodiments include methods, systems and computer program products that 1) Categorize incoming CIM Indications based on the Handler that would process them and the storage entity for which the event occurred and the CIMOM from which the CIM Indication was received; 2) Implement an EventCoolOffPeriod defined for the SMIS Client application that suppresses processing CIM Indication Handling such that for each EventCoolOffPeriod, if one or more Indications was received for a given combination of Handling Process, CIMOM, and storage entity, the Handling Process is invoked only once; 3) Detect an Indications Storm; 4) Alert the user when an Indications Storm is detected; and 5) Dynamically increase the EventCoolOffPeriod during the Indications Storm.

As described above, the SMIS 1.1 specification includes a standard mechanism to suppress redundant indications. The SMIS Client defines the indication suppression policy at the time that the indications are subscribed to. SMIS 1.1 describes this solution as Use of RepeatNotificationPolicy, and states: "The RepeatNotificationPolicy property defines the desired behavior for handling Indications that report the occurrence of the same underlying event (e.g., the disk is still generating I/O errors and has not yet been repaired). For SMI-S, this is extended to include multiple indications that are generated from a single IndicationFilter. The related properties are RepeatNotificationCount, RepeatNotificationInterval, and RepeatNotificationGap. The defined semantics for these properties depend on the value of RepeatNotificationPolicy, but values for these properties shall be set if the property is defined for the selected policy. If the value of RepeatNotificationPolicy is 2 (\"None\"), special processing of repeat Indications shall not be performed. If the value is 3 (\"Suppress\") the first RepeatNotificationCount Indications, describing the same event, shall be sent and all subsequent Indications for this event suppressed for the remainder of the time interval RepeatNotificationInterval. A new interval starts when the next Indication for this event is received. If the value of RepeatNotificationPolicy is 4 (\"Delay\") and an Indication is received, this Indication shall be suppressed if, including this Indication, RepeatNoticationCount or fewer Indications for this event have been received during the prior time interval defined by RepeatNotificationInterval. If this Indication is the RepeatNotificationCount+1 Indication, this Indication shall be sent and all subsequent Indications for this event ignored until the RepeatNotificationGap has elapsed. A RepeatNotificationInterval may not overlap a RepeatNotificationGap time interval. For SMI-S, a single indication filter that identifies a change in OperationalStatus on StorageVolumes would be subjected to the RepeatNotificationPolicy, even though the repeat notifications may be from multiple StorageVolumes. The RepeatNotificationPolicy can vary by implementation (or even IndictationFilter). However, it shall be specified on any subscription. The valid values for an SMI-S implementation are: 2 (\"None\"), 3 (\"Suppress\"), or 4 (\"Delay\"). An SMI-S profile may restrict this further for any given indication filter, but it cannot expand this to other policies without breaking interoperability. For example, a profile might restrict InstCreation filters for ComputerSystems to "None" and restrict InstModification filters on StorageVolume to "Suppress" or "Delay." But an SMI-S profile shall not define "unknown" as a valid SMI-S setting for the RepeatNotificationPolicy."

As described above, there are drawbacks and known issues to the solution defines in the SMIS 1.1 specification. One problem is that two or more Indication Filters may be routed to the same Handler. However the RepeatNotificationPolicy approach does not allow for Suppression for groups of Indication Filters. For instance, the SMIS Client may use the same Handler for both 'Active ZoneSet Changed' indications and 'Full Zone Database Changed' indications. If two 'Active ZoneSet' events and two 'Full Zone Database' events happened for the same fabric within a suppression/delay interval, the SMIS Agent would deliver one 'Active ZoneSet Changed' indication and one 'Full Zone Database Changed' indication for the suppression/delay interval, and the SMIS Client would route both of these indications to be handled by the same Handler. Ideally, this set of events should only be handled once during this interval since the same Handler is invoked and the events are for the same storage entity. Another problem of the solution is that users of SMIS Client applications may prefer CIM Indication delivery suppression intervals to be a shorter time interval than a time interval used by the SMIS Client application for handling the CIM Indications. For instance, the SMIS Client application may have a feature to Alert the user if more than 4 CIM Indications are generated within 60 seconds for Switch FCPort OperationalStatus Change, but the user may desire that the SMIS Client application process these Indications through the Handler only once per minute. This justifies the need for additional suppression on the client side prior to handling the CIM Indication. In addition, these SMIS Standard properties for suppressing Indications are not yet supported by some SMIS Agents. Furthermore, the user may desire that indication suppression intervals adjust dynamically during indication storm periods. For instance, under normal conditions, the delay/suppression interval may be 30 seconds, but if an Indications Storm condition is detected, the user may desire the delay/suppression interval to dynamically adjust to 120 seconds until the Indications Storm has ended.

As further discussed above, another solution to handling an Indications storm is the implementation of Static EventCoolOff, in which a SAN Management client uses an EventCoolOffPeriod that is static. The EventCoolOffPeriod is used for events coming from non-SMIS Data Sources. The EventCoolOffPeriod is defined for all non-SMIS fabric events and does not change during storms of events. The events are not categorized for specific post-event handling based on the type of event. If one or more events for a fabric are received during the EventCoolOffPeriod, a post-event Fabric Probe is triggered (this could be seen as a single Handler for all non-SMIS fabric events). However, there are also drawbacks and known solutions for Static EventCoolOff. Since SMIS has well-defined standard Indication Filters, a "single Handler for all fabric events" approach should not be used. Multiple handlers is appropriate for SMIS. In addition, the user may desire dynamically adjusting delay periods before handling the events.

In exemplary embodiments, "Redundant Indications" for Fabric CIM Indications are defined as two or more indications: delivered by the same CIMOM, for the same entity (i.e. a specific port, switch, etc), and routed to the same Handler. An EventCoolOffPeriod integer is defined for default delay of indications handling during normal circumstances (i.e. when an Indications Storm is not detected). In addition, a DynamicEventCoolOffMultTriggerCount integer and DynamicEventCoolOffMultiplier integer are defined for detecting Indications Storms and delaying processing the Indications by Handlers during Indications Storms. A 'DelayPostEvent-Thread' process is running constantly and receives indications and puts them into "Buckets" for indications. A new Bucket is defined when an indication is received and it is not redundant with any other indication received during the EventCoolOffPeriod. Each Bucket has a depth of only one indication. The most recent indication received replaces the existing indication in the Bucket. "Bucket Hit Counts" are also defined and tracked for each Bucket.

In exemplary embodiments, at the end of the EventCoolOffPeriod, the methods, systems and computer program products described herein determine whether an Indications Storm is happening. If no Indication Storm is detected, the methods, systems and computer program products described herein routes each indication from each Bucket to the appropriate Handler and clears the Buckets and BucketHitCounts. If the number of redundant indications received for a CIMOM/device/Handler combination (BucketHitCount) meets or exceeds <DynamicEventCoolOffMultTriggerCount> within the <EventCoolOffPeriod>, then the EventCoolOffPeriod used will be <EventCoolOffPeriod>× <DynamicEventCoolOffMultiplier> for that CIMOM/device/Handler combination. In exemplary embodiments, this process is not recursive; the EventCoolOffPeriod is only adjusted once during an indications storm. After the dynamic EventCoolOffPeriod is used, the next EventCoolOffPeriod used for that CIMOM/device/Handler combination returns to normal (unless the number of indications again exceeds the DynamicEventCoolOffMultTriggerCount threshold). In exemplary embodiments, the user can be alerted when a BucketHitCount exceeds the DynamicEventCoolOffMultTriggerCount, so that the user is aware of the Indication Storm and is aware the SMIS Client has adjusted the delay time for processing the indications handlers.

FIG. 1 illustrates an exemplary embodiment of a system 100 for dynamic categorized event cool off for CIM indications. It is appreciated that the system 100 may represent a single SMIS client in a SAN. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105. It is appreciated that the CIM indications handler can be located in the memory 110.

The software in memory 110 may include one or more separate programs, each of which comprises an ordered listing of executable instructions for implementing logical functions. In the example of FIG. 1, the software in the memory 110 includes the dynamic categorized event cool off for CIM indications methods described herein in accordance with exemplary embodiments and a suitable operating system (OS) 111. The operating system 111 essentially controls the execution of other computer programs, such the dynamic categorized event cool off for CIM indications systems and methods described herein, and provides scheduling, input-output control, file and data management, memory management, and communication control and related services.

The dynamic categorized event cool off for CIM indications methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the dynamic categorized event cool off for CIM indications methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. It is appreciated that the CIM indications from a subscription to receive the CIM indications can be received from the network 165.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The dynamic categorized event cool off for CIM indications methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The dynamic categorized event cool off for CIM indications methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the dynamic categorized event cool off for CIM indications methods are implemented in hardware, the dynamic categorized event cool off for CIM indications methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
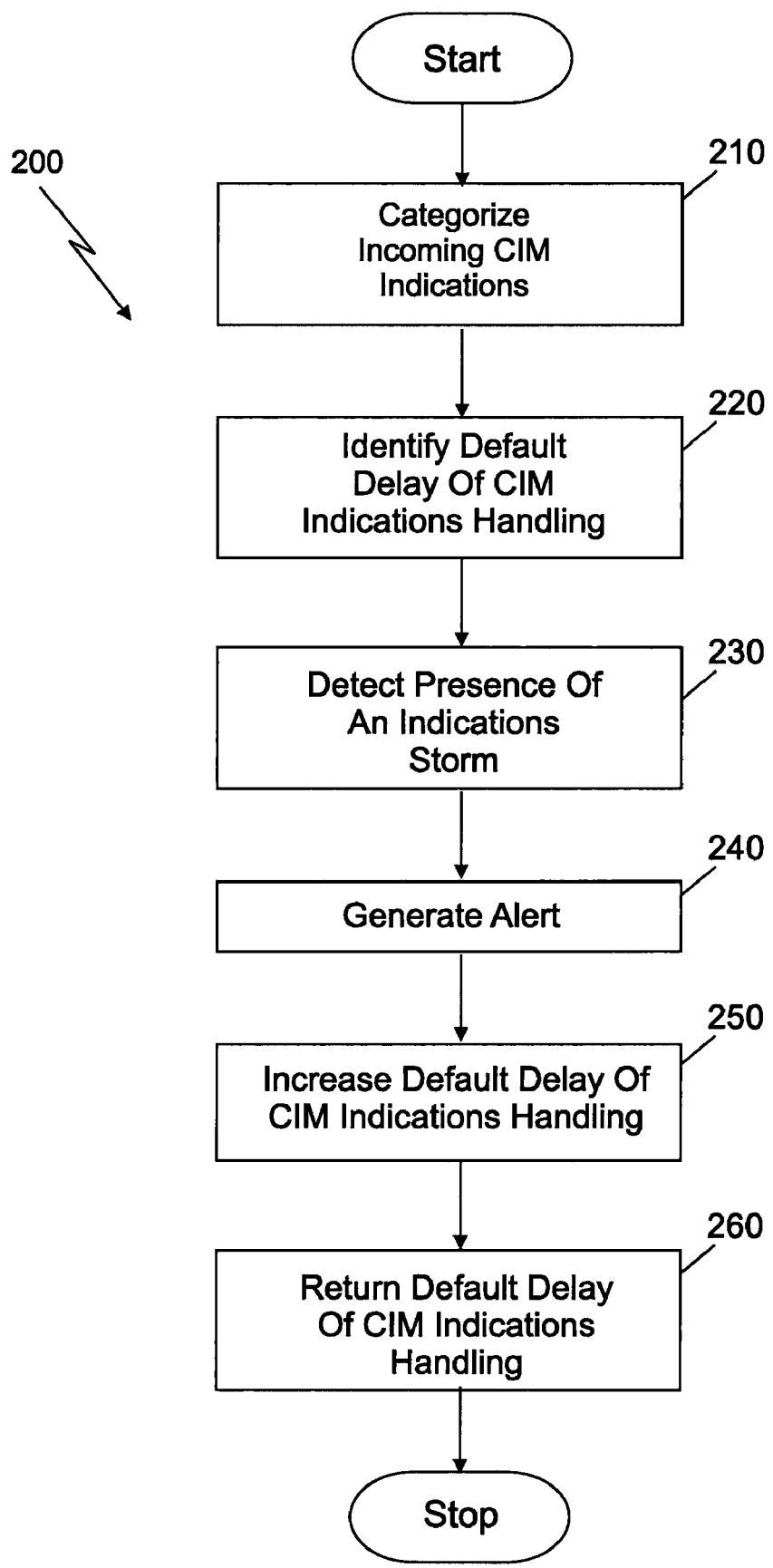
FIG. 2 illustrates a method for dynamic categorized event cool-off for CIM indications for a SMIS client having a handler for CIM indications in accordance with exemplary embodiments.

As described above, the methods systems and computer program products described herein provide a dynamic categorized event cool off for CIM indications. FIG. 2 illustrates a method 200 for dynamic categorized event cool-off for CIM indications for a SMIS client having a set of handlers for CIM indications in accordance with exemplary embodiments. At block 210, the method 200 categorizes incoming CIM Indications into the SMIS client, the categorization being based on the handler for processing the CIM indications and the storage entity represented in the CIM Indication. At block 220, the method 200 identifies a default delay of CIM indications handling during SMIS client operation in an absence of an indications storm. In exemplary embodiments, the default delay given by EventCoolOffPeriod, which suppresses a subsequent processing of the CIM indication handling such that for each EventCoolOffPeriod, if one or more Indications are received for a given combination of CIM indication handling process and storage entity, the given CIM indication handling process is invoked only once for each unique storage entity. At block 230, the method 200 detects the presence of an indications storm in the SMIS client. At block 240, the method 200 generates an alert when the indications storm is detected, which is sent to the user. At block 250, the method 200 increases the default delay of CIM indications handling during the indications storm. In exemplary embodiments, an increase of the default delay of CIM indications handling is a dynamic delay given by a product of the EventCoolOffPeriod and a multiplier, DynamicEventCoolOffMultiplier. At block 260, the method 200 returns the default delay of CIM indications handling to EventCoolOffPeriod.

In further exemplary embodiments, the methods, systems and computer program products described herein can include no feature for alerting the user when the Indications Storm is detected. Furthermore, the EventCoolOffPeriod can automatically adjust when the sum of the BucketHitCounts for all buckets exceeds the DynamicEventCoolOffMultTriggerCount, rather than when any one BucketHitCount exceeds this number. In addition, the methods, systems and computer program products described herein can include only one Handler (for instance if a complete Fabric Probe is run for any CIM Indication) for all CIM Indications, with only one bucket, but still using the DynamicEventCoolOffMultTriggerCount and DynamicEventCoolOffMultiplier The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for dynamic categorized event cool-off for common information model (CIM) indications for a storage management initiative-specification (SMIS) client having a set of one or more handlers for CIM indications, the method consisting of:
   categorizing, in a processor, incoming CIM Indications into the SMIS client, the categorization being based on at least one of a common information model object manager (CIMOM) which delivered a respective CIM indication, a storage entity represented in the respective CIM Indication and a handler to which the CIM Indication is routed for processing;
   identifying, in the processor, a default delay of CIM indications handling during SMIS client operation in an absence of an indications storm, the default delay given by EventCoolOffPeriod, which suppresses a subsequent processing of the CIM indication handling such that for each EventCoolOffPeriod, if one or more Indications are received for a given combination of at least one of a CIMOM which delivered a respective CIM indication, a storage entity represented in the respective CIM Indication and a handler to which the CIM Indication is routed for processing, the given CIM indication handling process is invoked only once for each storage entity;
   detecting, in the processor, the presence of an indications storm in the SMIS client;
   generating, in the processor, an alert when the indications storm is detected;
   increasing, in the processor, the default delay of CIM indications handling during the indications storm, wherein an increase of the default delay of CIM indications handling is a dynamic delay given by a product of the EventCoolOffPeriod and a multiplier, DynamicEventCoolOffMultiplier; and
   returning, in the processor, the default delay of CIM indications handling to EventCoolOffPeriod.

2. The method as claimed in claim 1 wherein the respective CIM indication is at least one of a port and a switch.

* * * * *